C. J. DEWEY.
BY-PASS VALVE.
APPLICATION FILED FEB. 26, 1921.
1,417,808.
Patented May 30, 1922.
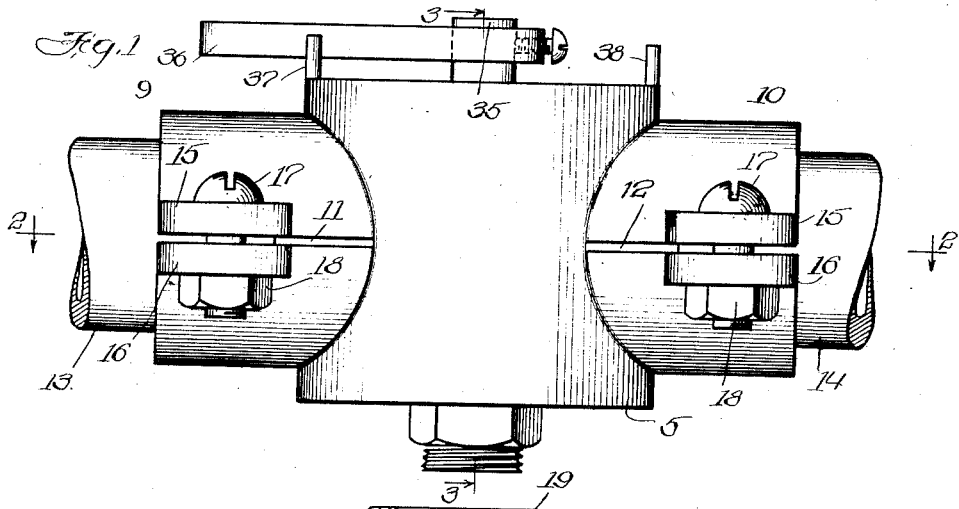
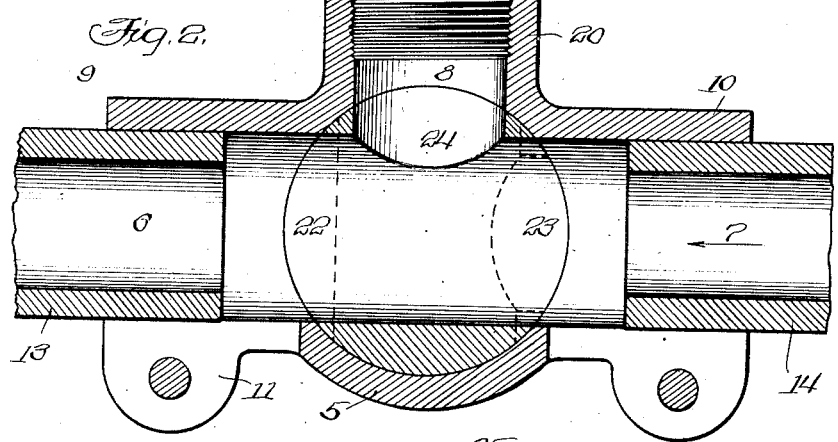
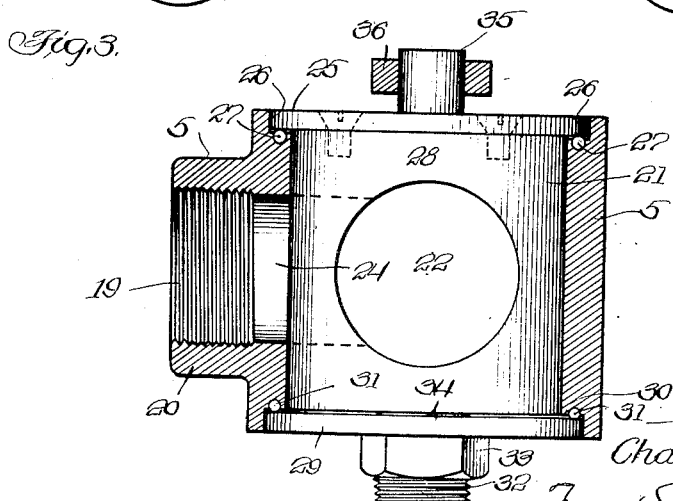
Inventor:
Charles J. Dewey

UNITED STATES PATENT OFFICE.

CHARLES J. DEWEY, OF CHICAGO, ILLINOIS.

BY-PASS VALVE.

1,417,808. Specification of Letters Patent. Patented May 30, 1922.

Application filed February 26, 1921. Serial No. 447,947.

*To all whom it may concern:*

Be it known that I, CHARLES J. DEWEY, a citizen of the United States, residing at Chicago, in the county of Cook and State of Illinois, have invented certain new and useful Improvements in By-Pass Valves, of which the following is a specification.

The invention relates to improvements in by-pass valves, and it has especial reference to so-called cut outs for automobiles.

One of the objects is to provide an improved three way valve.

Another object of the invention is to provide a valve that may be manipulated with minimum resistance.

Another object is to provide a valve especially applicable as a cut out to divert the exhaust products of combustion from an engine from the muffler into a free open passage into the atmosphere, thereby reducing back pressure to a minimum.

Another object is to provide a valve that may be rotated with very little resistance, so as to conveniently divert the exhaust gases into a signaling or alarm device such as a horn, whistle, or the like.

Other, further and more specific objects of the invention will become readily apparent, to persons skilled in the art, from a consideration of the following description, when taken in conjunction with the accompanying drawing, wherein:—

Fig. 1 is a side elevation of the valve.

Fig. 2 is a longitudinal section taken on line 2—2 of Fig. 1.

Fig. 3 is a transverse, central section taken on line 3—3 of Fig. 1.

In all the views the same reference characters are employed to indicate similar parts.

A T-shape casing 5 is centrally bored, as at 6—7, with an intermediate bisecting bore 8. The arms 9 and 10 are split, as at 11 and 12, respectively, to admit smooth end pipes 13 and 14. On each side of each split are lateral ears 15 and 16, having registering perforations to admit clamping screws 17 on the ends of which are the nuts 18 by means of which the pipes 13 and 14 are tightly clamped in the respective ends of the casing. This is a convenient manner of securing the pipes to the casing. The arms may, however, be threaded, as at 19, in the arm 20, or, instead, the arm 20 may be split and clamped on the pipe as the arms 9 and 10.

The casing 5 is bored transversely at the point of juncture of the bores 6, 7 and 8 to admit a three way valve 21. The valve has bores 22, 23 and 24 corresponding to the bores 6, 7 and 8.

On one end of the valve 21 is secured a disk 25 somewhat larger than the valve and which is received in an annular counterbore or rabbet 26 in which are contained a series of balls 27 to reduce friction engendered by movement of the valve. The disk 25 is secured to the valve by screws 28, or other convenient means.

Another disk 29 overlies the other end of the valve and it is received in a rabbet 30 within which is another series 31 of steel balls.

A threaded stem 32 passes through an aperture in the disk which is held in place by the nut 33. A shim 34 surrounds the stem 32 and serves as a convenient manner for adjusting the neatness of fit within the casing.

A stem 35 projects through the disk 25 and connected thereto is a handle 36 by means of which the valve may be rotated.

On account of the corroding effect of the hot gases of combustion that pass through the pipes 6 and 7, the ordinary valve soon becomes substantially immovable and unfit for use, especially is this evident if effort be made to rotate it to divert the exhaust gases into a signal device.

The delinquency of such valves renders this manner of signaling unavailable and resort is had to electric horns.

By the use of the improved valve a signal may be initiated with as little effort as the mere depression of a push button.

The pins 37 and 38 limit the movement of the operating lever 36 so that it cannot be rotated more than 90 degrees. When it is in contact with one pin the valve is open through the coaxial bores and when it is in contact with the other pin the valve will be open through the bores 6 and 8, or 7 and 8, and the other opening will be closed.

While I have herein shown a single embodiment of my invention for the purpose of clear disclosure, it will be manifest, to persons skilled in the art, that many changes may be made in the general arrangement and configuration of the parts, within the scope of the appended claim.

Having described my invention what I claim as new and desire to secure by Letters Patent, is:—

In a three-way valve, a casing having a straight-away bore and an intermediate, bisecting bore with a transverse bore extending through the point of divergence of the two said bores and with a rabbet surrounding each terminal end of the transverse bore; a three-way valve rotatable in said transverse bore and having a stem extending axially from its axis at one end; a disk overlying a stem at one end and secured to the valve and lying in the adjacent rabbet; another disk overlying the other end of the valve and lying in the other rabbet; a ball race in each rabbet with balls therein in contact with the respective discs; a shim between one disk and the adjacent end of the valve; means to secure the disks to the respective ends of the valves and a handle secured to one of said stems to rotate the valve.

In testimony whereof I hereunto subscribe my name.

CHARLES J. DEWEY.